United States Patent [19]

Spears

[11] Patent Number: 5,536,062
[45] Date of Patent: Jul. 16, 1996

[54] CROSS WIND CONDITIONING FOR A TRACTOR TRAILER COMBINATION

[76] Inventor: Dan E. Spears, 3515 Westfield Dr., Brandon, Fla. 33511

[21] Appl. No.: 351,831

[22] Filed: Dec. 8, 1994

[51] Int. Cl.⁶ ................................................. B62D 35/00
[52] U.S. Cl. .................... 296/180.3; 296/180.5; 180/903
[58] Field of Search ............ 296/180.1–180.5; 180/903

[56] References Cited

U.S. PATENT DOCUMENTS

| | | | |
|---|---|---|---|
| 1,573,086 | 2/1926 | Miller et al. | 296/85 |
| 4,199,185 | 4/1980 | Woolcock | 296/180.2 |
| 4,693,506 | 9/1987 | Massengill | 296/180.3 |
| 5,013,080 | 5/1991 | Garrone et al. | 296/180.5 |
| 5,092,648 | 3/1992 | Spears | 296/180.3 |
| 5,379,218 | 1/1995 | Jacobi et al. | 296/180.5 X |

FOREIGN PATENT DOCUMENTS

| | | | |
|---|---|---|---|
| 3620843 | 12/1987 | Germany | 296/180.5 |
| 1036610 | 8/1983 | U.S.S.R. | 296/180.2 |
| 2089303 | 6/1982 | United Kingdom | 296/180.3 |

*Primary Examiner*—Dennis H. Pedder

[57] ABSTRACT

The conditioning of cross winds by providing up to four separate groups of segmented panels being the main segmented panels of the segmented air deflector, opposing segmented side pivotal panels, opposing segmented upper side pivotal panels and opposing segmented lower side pivotal panels. Various implementations of application of these groups provide versatility for varying conditions and vehicle configurations. A method of measuring for cross wind conditions and selective engaging the various deployed segmented panels is disclosed. The use of wing members either fixed or variably mounted on or about the various panels to condition, and therefore better control wind flow, is taught.

19 Claims, 12 Drawing Sheets

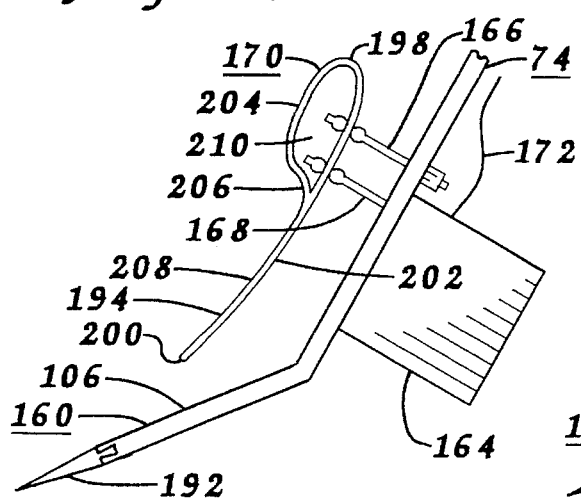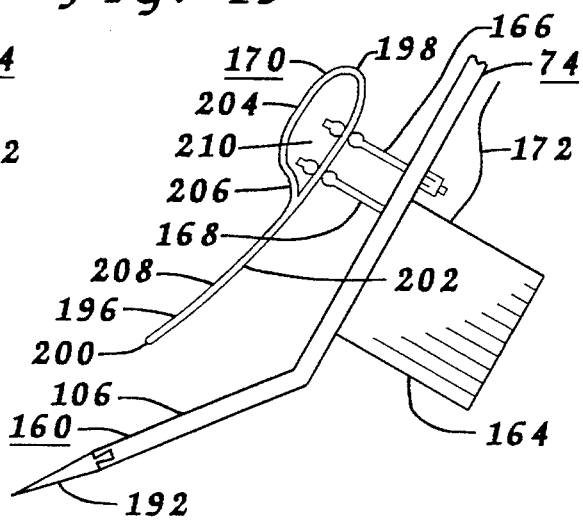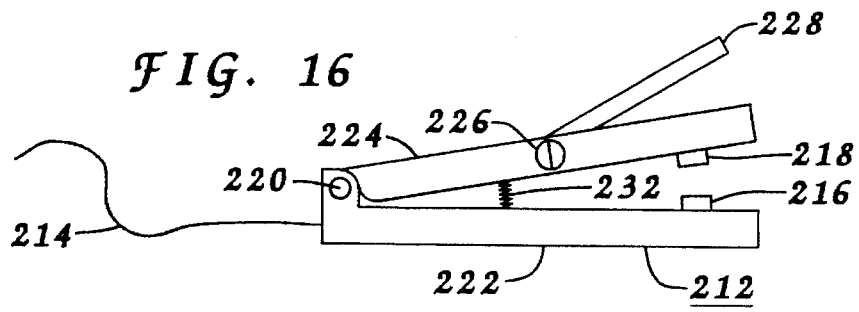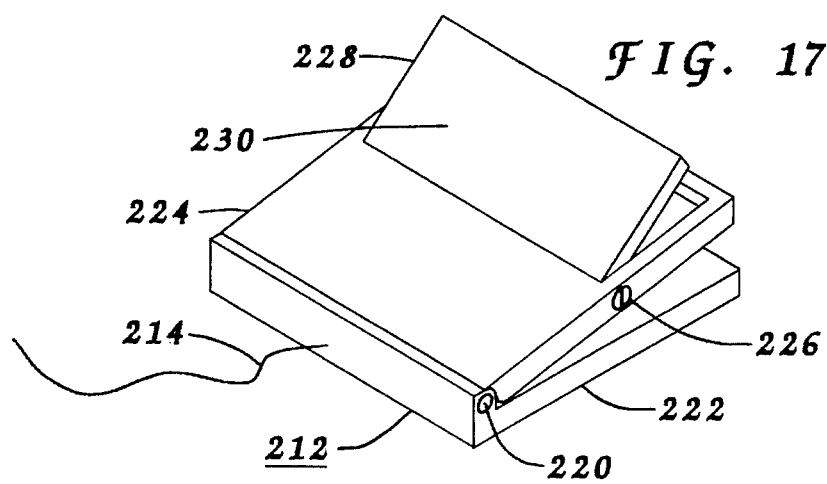

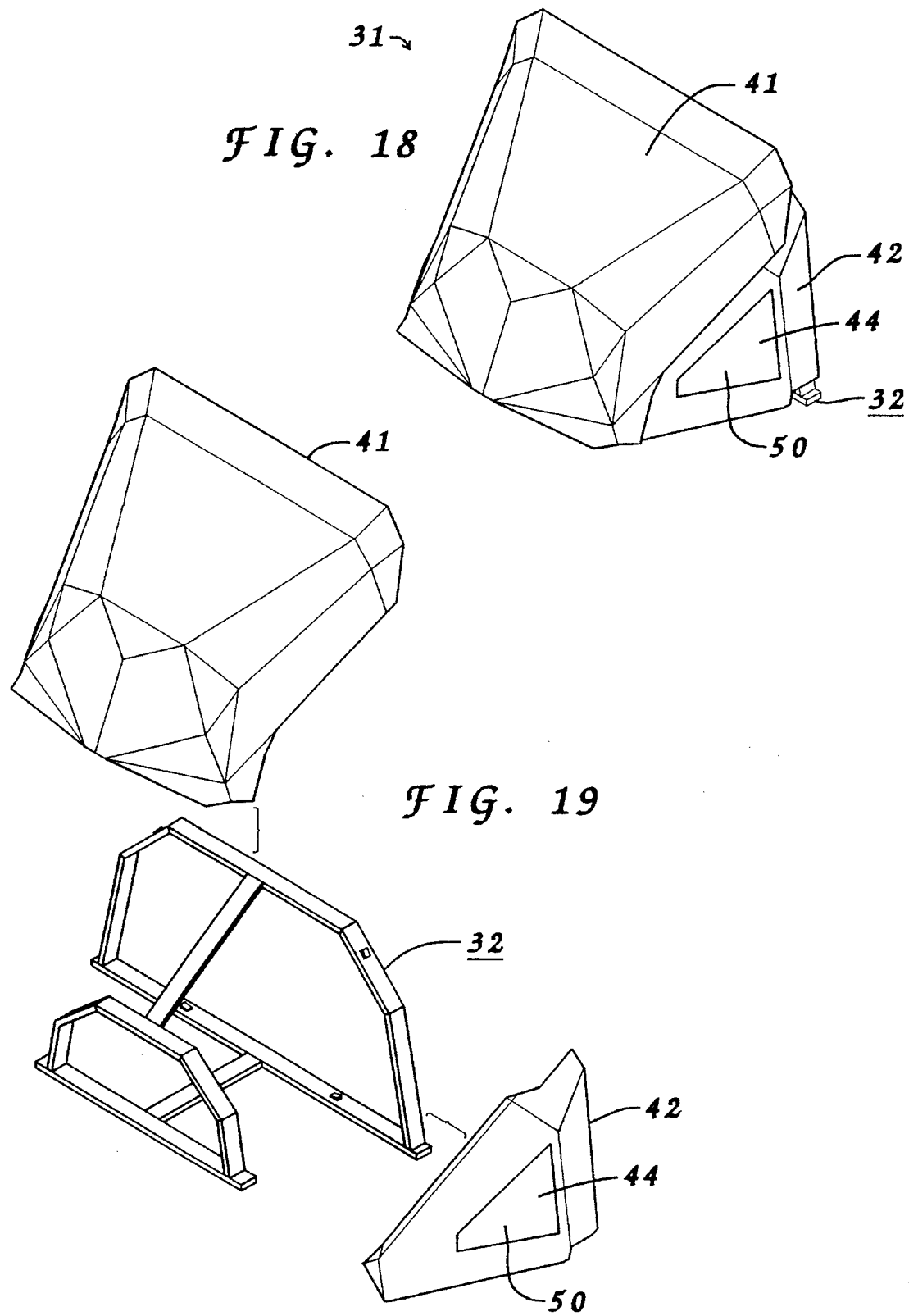

CROSS WIND CONDITIONING FOR A TRACTOR TRAILER COMBINATION

BACKGROUND

1. Field of the Invention

The field of the invention relates to reducing the influence of cross winds on tractor trailer combinations by providing for the automated manipulation of various panels for a stable blending of such winds relative to the tractor trailer combination.

2. Description of the Prior Art

The various effects of cross winds on tractor trailer combinations are issues of extreme importance in traffic safety. During normal movements of a tractor trailer combination, when the forward speed of the unit is significantly greater than the wind velocity, the air strikes the unit from a forward quadrant. This is true regardless of the direction of the wind, if the velocity of that wind is significantly less than the speed of the vehicle. Cross winds conditions exist when a significant force is exerted on the tractor trailer combination from a direction other than from the line of travel of the unit. One such condition is when high wind speed is present and the wind direction is crossing the path of the unit. Another such condition is when the wind is gusty, when the wind velocity fluctuates broadly. Yet another such condition is when the tractor trailer combination is traveling in areas where intermittent wind breaks exist such as hills, valleys, bridges, forests, buildings or other locations where severe cross wind conditions are known to exist are in close proximity to the line of travel, which cause wind which has a relatively stable velocity to fluctuate widely relative to the vehicle. Cross winds cause the vehicle operator to experience sudden, and often unpredictable, pulling of the vehicle which must be compensated for by steering into the direction that the force is being applied from. Due to the extreme size and weight of the tractor trailer combination this can cause a temporary loss of control by the operator.

Contemporary fairings, while providing for a smoothing of the outline of the tractor trailer unit to reduce drag, fail to address the need to compensate for cross wind conditions. Generally fairings are comprised of a single shell constructed of either fiberglass or a metal alloy and attached to the top of the roof of the tractor. These units are usually specifically designed to be installed on a particular model of tractor. When the fairing is damaged during usage, such as being cracked or otherwise deformed, repairs are difficult. Generally the entire shell must be replaced. Additionally the single shell unit is difficult to transport during the distribution phase following manufacture, as the unit is large, bulky and rigid.

Various attempts have been made to provide fairings with air redirection capabilities to cause the air flow, from the forward movement of the tractor trailer combination, to selectively impinge the forward face of the trailer to exert a braking force. My prior U.S. Pat. No. 5,092,648, succeeded in addressing this issue while failing to address the issue of cross winds. Further my prior patent did not address the turbulent wash of disturbed air flowing over and past the forward surfaces of the vehicle's fenders, hood or windshield. Additionally it is noted that my prior spaced gates were designed to retro fit into an existing conventional fixed fairing shell, either installed in a single shell unit or in a sectioned or halved shell unit having various corresponding opening incorporated therein. This effort failed to address several needs including the need for a air deflector which was capable of being shipped in a compact crate for later assembly and the replacement of damaged panel surfaces and components.

As such, it may be appreciated that there continues to be a need for a method of sensing cross wind conditions and redirecting the air flow to reduce the adverse effects associated with cross winds. Additionally there exists a need for an air deflector versatile enough to fulfill multiple tasks yet capable of being transported in a relatively small crate and assembled at the location of installation. The present invention substantially fulfills these needs.

SUMMARY

In view of the foregoing disadvantages inherent in the known types of fairings, the present invention provides for measuring for cross wind conditions and providing for a bleeding off of the excess air flow to compensate and reduce the lateral pressure being applied to the vehicle. The term segmented is hereafter used to define sections substantially comprised of plural relatively plane or level, sections definable by relatively sharp edges between the sections. A segmented air deflector formed of a frame system and various attached segmented panels is provided. Several of the segmented panels, in the form of pivotal panels, are hinge mounted relative to the frame. The pivotal panels transverse the segmented air deflector above and to the rear of a front panel. While the pivotal panels are in the closed position they cooperate with the front panel to act as an air fairing. The pivotal panels, in the open position, have as their primary function the redirection of the air flow to impinge upon the forward face of the trailer to cause drag and therefore exert a braking force to the tractor trailer combination. Left and right side pivotal panels are mounted in their respective left and right side panels on opposing sides of the segmented air deflector. Such pivoting preferably being inward relative to the segmented air deflector. These left and right side pivotal panels selectively open to redirect a portion of the air flow to pass between the tractor and the trailer during cross wind conditions. If severe cross wind conditions are encountered, the pivotal panels as well as the respective left or right side pivotal panels would open to provide relief from the pressure. This action would reduce the effects of the cross winds, while causing the air flow to impinge the forward face of the trailer to provide a braking effect which would assist the operator in maintaining control of the tractor trailer combination. Left and right segmented upper side pivotal panels, are pivotally attached to the rear horizontal sides of the segmented air deflector. The left and right segmented upper side pivotal panels each have an outward sweeping trailing edge which redirects air flow around the upper section of the facing horizontal front of the trailer. Opposing left and right segmented lower side pivotal panels are each separately pivotally attachable to the tractor. The left and right segmented lower side pivotal panels similarly have an outward sweeping trailing edge which redirects air flow around the lower section of the facing horizontal front of the trailer. During cross wind conditions the segmented side pivotal panels, either upper or upper and lower, would be caused to retract inward slightly allowing the air flow to pass between the tractor and the trailer, reducing the effects of the cross winds while exerting a braking effect on the tractor trailer combination.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposed of the present invention. It is important, therefore, that the claims be regarded as including such equivalent constructions insofar as they do not depart from the spirit and scope of the present invention.

It is therefore an object of the present invention to provide a segmented air deflector formed of a frame system and various segmented panels, the segmented panels forming substantially the entire exterior exposed surface of the segmented air deflector.

It is another object of the present invention to provide for ease of distribution of the segmented air deflector by allowing for assembly of the segmented air deflector to be performed at the location of installation.

It is a further object of the present invention to allow for ease of repair to a damaged segmented air deflector by having the entire exterior exposed surface formed of the various segmented panels, such repair comprising the physical repair of the affected panel or its selective replacement.

An even further object of the present invention to provide four separate cross wind manipulating panel groups, being the pivotal panels, the left and right side pivotal panels, the left and right segmented upper side pivotal panels and the left and right segmented lower side pivotal panels. This variety will permit varied installation depending upon the configuration of the particular tractor and the envisioned trailers to be employed with the particular tractor.

Yet another object of the present invention is to provide for the panels to be segmented, or formed of substantially flat level areas with sharp definable lines between the various areas, to change the swirling of the turbulent wash of air flowing over and past the vehicles forward surfaces, to otherwise enhance air flow control, increase strength and ensure aesthetic appeal.

Still yet another object of the present invention is to provide for the optional installation of fixed or variable wing members on various selected positions on the segmented air deflector being, the front panel, the pivotal panels, the rearward part of the left and right side panels, the left and right segmented upper side pivotal panels or the left or right segmented lower side pivotal panels. Such placement to condition and better control the direction of the air flow so as to make the air flow more controllable by the segmented air deflector in the various positions.

An even further object of the present invention is to provide for the various panels to mate together when in the closed position so as to provide as smooth a surface as possible providing the least drag possible.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 14 is an overhead plan view of a variable wing member in the retracted position.

FIG. 15 is a view as illustrated in FIG. 14 with the wing member in the extended position.

FIG. 16 is a side plan view of a wind tab.

FIG. 17 is a perspective view of the wind tab illustrated in FIG. 16.

FIG. 18 is a perspective view of a second embodiment of a segmented air deflector.

FIG. 19 is an exploded perspective view of the segmented air deflector illustrated in FIG. 18.

DESCRIPTION OF THE PREFERRED EMBODIMENT

Figure 1:
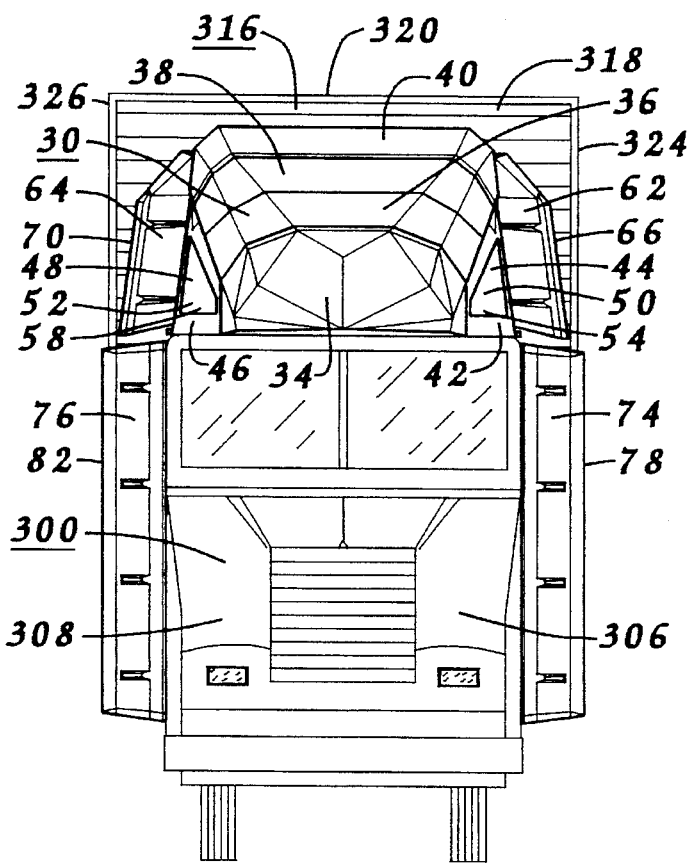
FIG. 1 is a front plan view of a segmented air deflector mounted on a tractor with a trailer attached with the various panels in the closed or extended positions.
Figure 2:
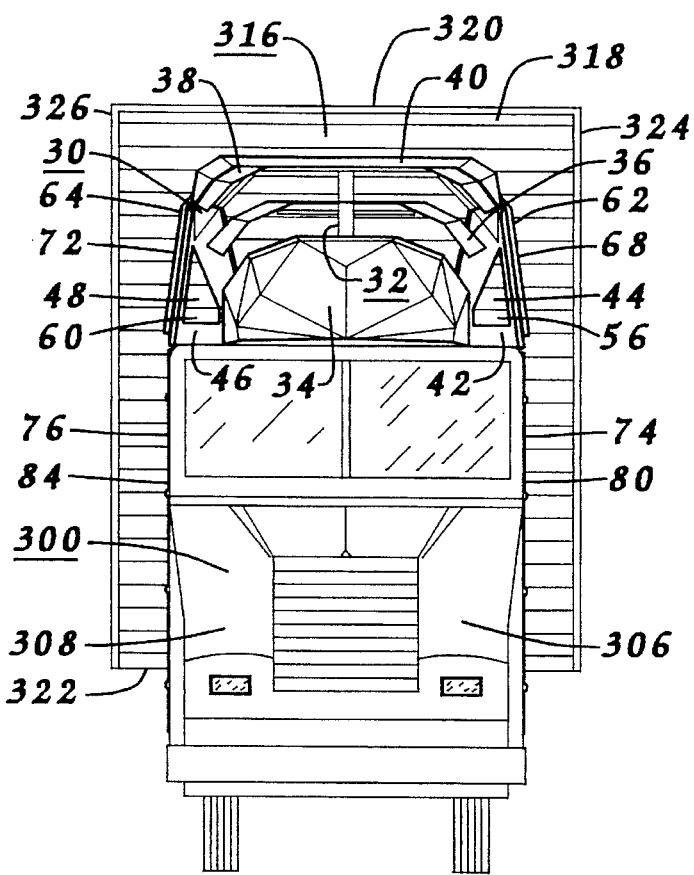
FIG. 2 is a view as illustrated in FIG. 1 with the various panels in the open or retracted positions.
Figure 3:
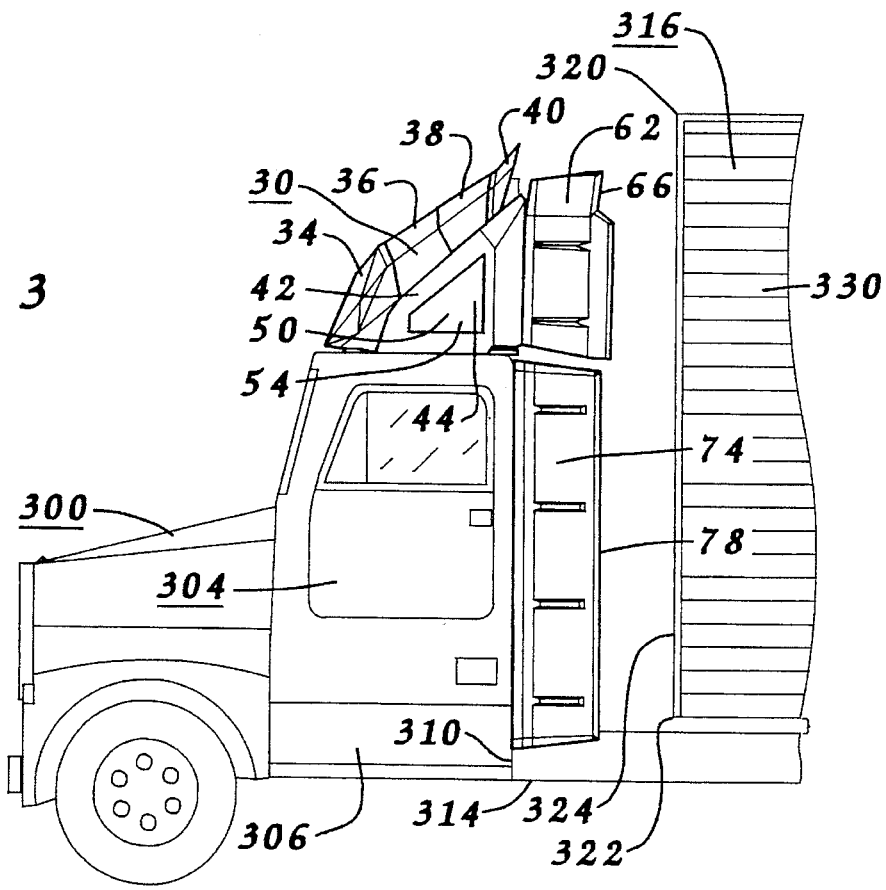
FIG. 3 is a side plan view of the illustration of FIG. 1.
Figure 4:
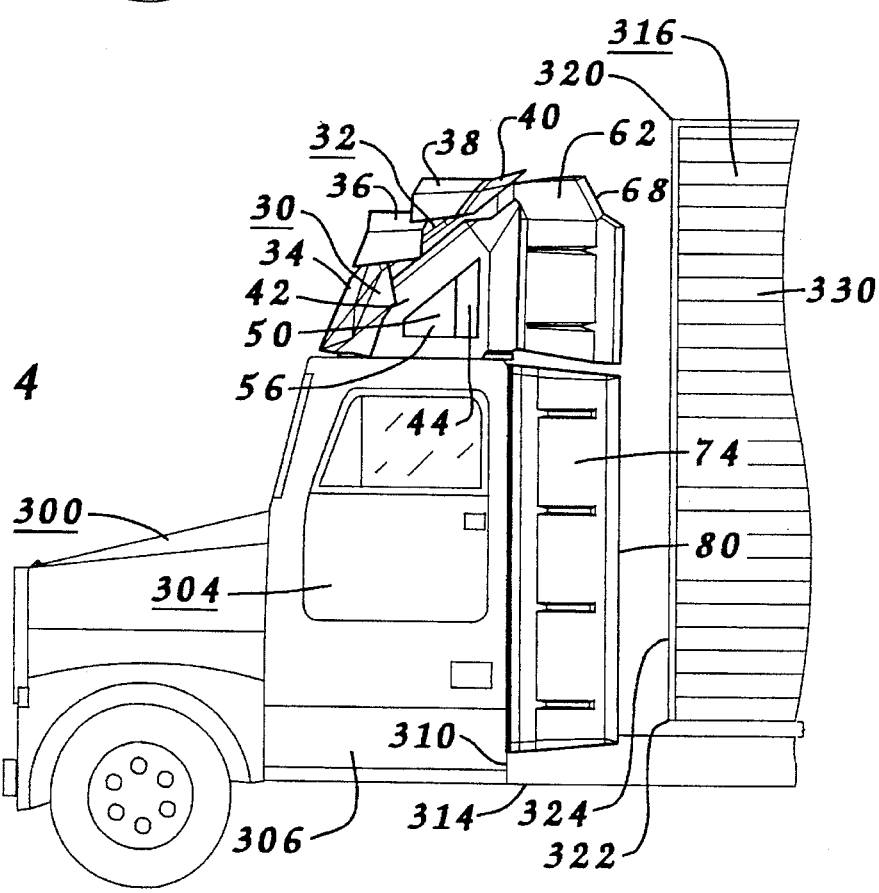
FIG. 4 is a side plan view of the illustration of FIG. 2.
Figure 5:
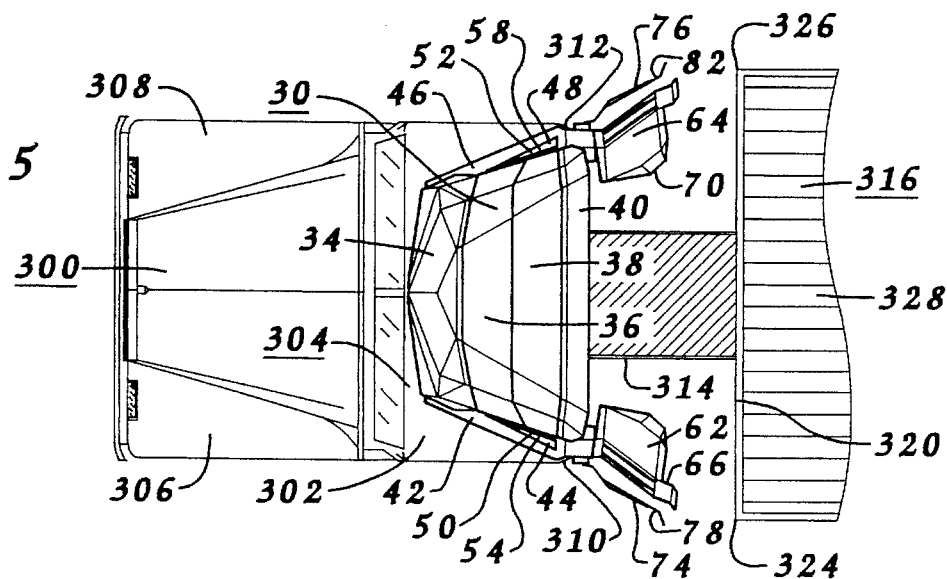
FIG. 5 is an overhead plan view of the illustration of FIG. 1 and FIG. 3.
Figure 6:
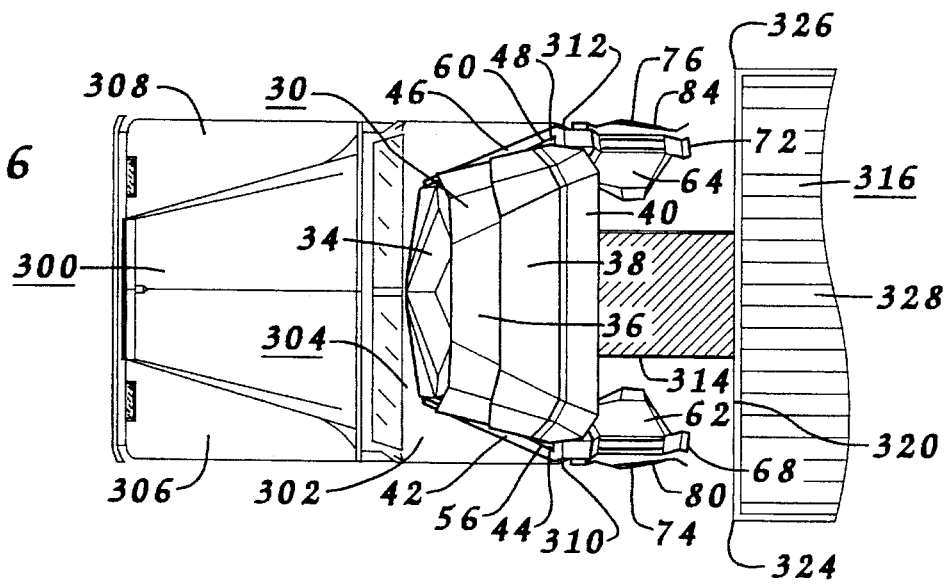
FIG. 6 is an overhead plan view of the illustration of FIG. 2 and FIG. 4.

Referring now to the drawings where like reference numerals refer to like parts throughout the various views, and specifically referring to FIG. 1 through FIG. 6 a segmented air deflector 30 is depicted with the various panels in alternating positions. FIG. 1, FIG. 3 and FIG. 5 place all pivotal panels in their respective closed or extended positions while FIG. 2, FIG. 4 and FIG. 6 place all pivotal panels in their respective open or retracted positions. A tractor 300 having a left side 306 and a right side 308 is illustrated having attached thereto, utilizing a connection member 314, a trailer 316. It being understood that tractor 316 has a forward direction of travel and during such travel encounters an air flow which passes around tractor 300 and trailer 318. Tractor 300 has a tractor housing 304 being generally the operator compartment rearward. Trailer 316 has a forward face 318 bordered by an upper edge 320, a lower edge 322, a left side edge 326 and a right side edge 326. Trailer 316 additionally has a roof area 328 and a side area 330. A roof area 302 of tractor 300, as shown in FIG. 5 and FIG. 6, has attached thereto segmented air deflector 30. Segmented air deflector 30 is comprised of a frame system 32, a front panel 34, a first pivotal panel 36, a second pivotal panel 38, a spoiler panel 40, a left side panel 42, a left side pivotal panel 50, a right side panel 46 and a right side pivotal panel 52. While in the closed position, as illustrated in FIG. 1, FIG. 3 and FIG. 5, segmented air deflector 30 acts to streamline the air flow around trailer 316 to reduce drag. While in the open position, as illustrated in FIG. 2, FIG. 4 and FIG. 6, segmented air deflector 30 acts to redirect the air flow to achieve several results including to produce drag to exert a braking effect upon the combination of tractor 300 and trailer 316. Left side panel 42 has a left portal 44 incorporated therein while right side panel 46 has a right portal 48 incorporated therein. A left side pivotal panel 50 is attached to left side panel 42 as detailed below and has a closed position 54 and an open position 56. Closed position 54 prevents air flow from entering left portal 44 while open position 56 permits entry of air flow through left portal 44. A right side pivotal panel 52 is attached to right side panel 46 as detailed below and has a closed position 58 and an open position 60. Closed position 58 prevents air flow from entering right portal 48 while open position 60 permits entry of air flow through right portal 48. Attached to segmented air deflector 30, and extending generally rearwardly, are a left segmented upper side pivotal panel 62 and a right segmented upper side pivotal panel 64. Left segmented upper side pivotal panel 62 has an extended position 66 and a retracted position 68. Right segmented upper side pivotal panel 64 has an extended position 70 and a retracted position 72. While in their respective extended positions, 66 and 70, redirection of air flow to reduce drag is accomplished. While in their respective retracted positions, 68 and 72, air flow may impinge forward face 318 of trailer 316 or pass between tractor 300 and trailer 316. Tractor 300 has a left vertically oriented trailing edge 310 and a right vertically oriented trailing edge 312. Hinge mounted to tractor 300, in close proximity to left vertically oriented trailing edge 310, is a left segmented lower side pivotal panel 74 which extends generally rearwardly. Left segmented lower side pivotal panel 74 has an extended position 78 and a retracted position 80. Hinge mounted to tractor 300, in close proximity to right vertically oriented trailing edge 312, is a right segmented lower side pivotal panel 76 which extends generally rearwardly. Right segmented lower side pivotal panel 76 has an extended position 82 and a retracted position 84. While in their respective extended positions, 78 and 82, redirection of air flow to reduce drag is accomplished. While in their respective retracted positions, 80 and 84, air flow may impinge forward face 318 of trailer 316 or pass between tractor 300 and trailer 316.

It is understood that while the invention is illustrated installed on a tractor having a trailer pivotally and detachably mounted thereto, that van type trucks, having the trailer section rigidly and permanently attached to the tractor section, are applicable to the invention.

Figure 7:
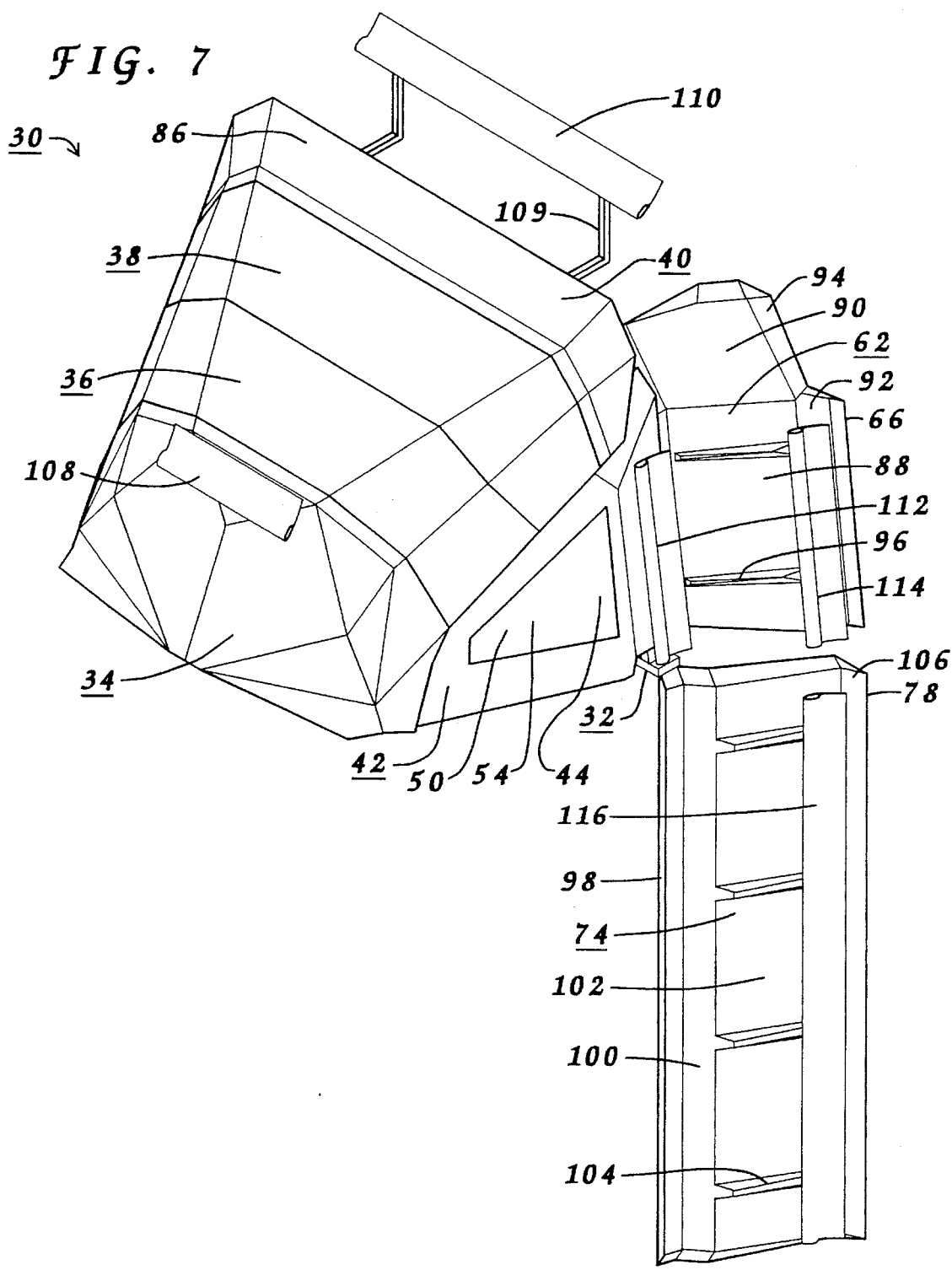
FIG. 7 is a enlarged perspective view of the various panels as illustrated in FIG. 1 through FIG. 6 in the closed or extended positions, with various wing members attached thereto.
Figure 8:
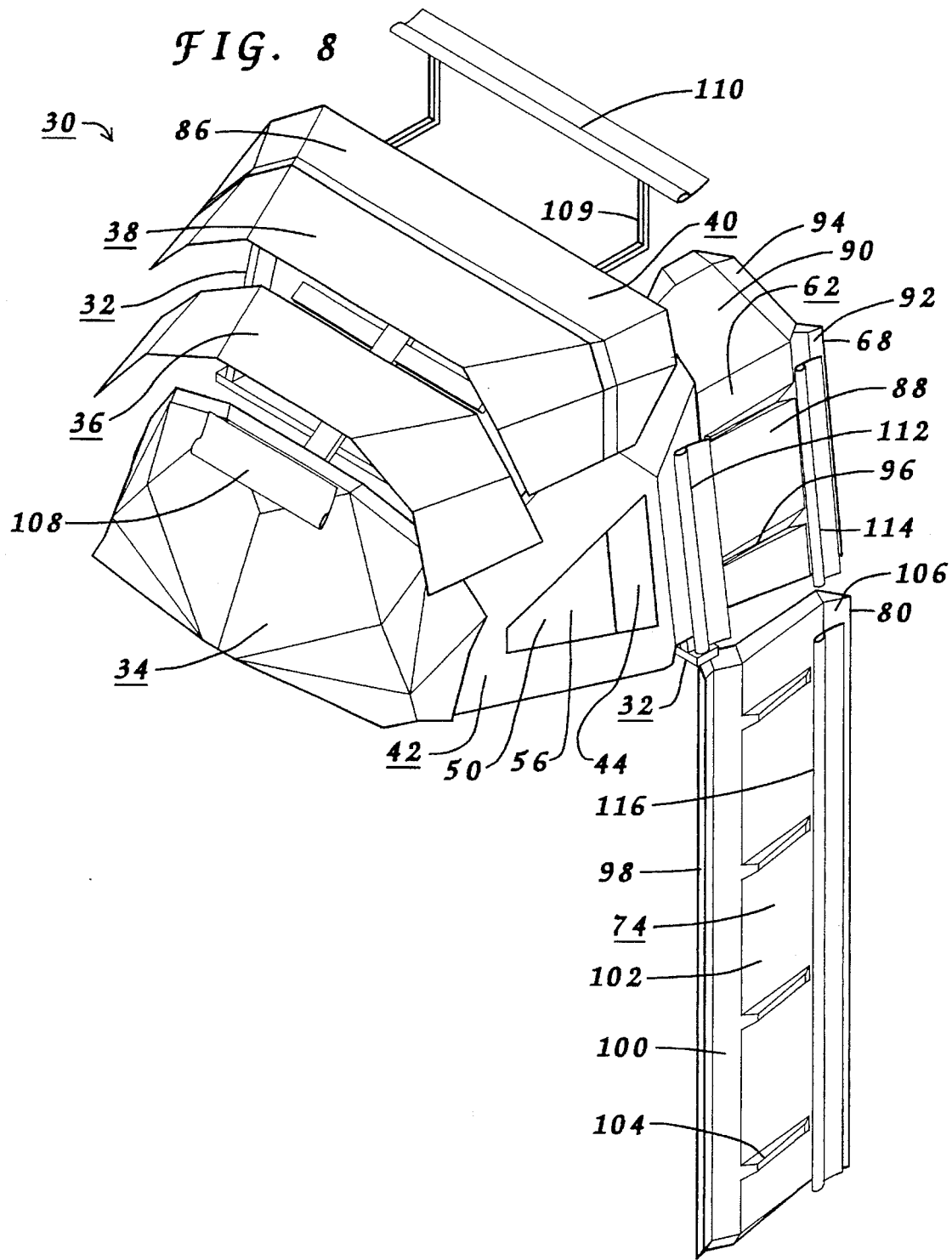
FIG. 8 is a view as illustrated in FIG. 7 with the various panels in the open or retracted positions.

FIG. 7 and FIG. 8 provide a more detailed illustration of segmented air deflector 30, left side panel 42, left side pivotal panel 50, left segmented upper side pivotal panel 62 and left segmented lower side pivotal panel 74 as shown in FIG. 1 through FIG. 6. It being understood that corresponding right side panels have been eliminated for illustrative purposes. FIG. 7 places the various panels in their closed or extended positions while FIG. 8 places the various panels in their open or retracted positions. Front panel 34 and left side panel 42 are rigidly secured to frame system 32. Attached to front panel 34 is a wing 108, either rigidly or variably, which acts to condition and control the air flow. First pivotal panel 36 is pivotally mounted to frame system 32. Second pivotal panel 38 and spoiler panel 40 are rigidly fixed together and pivotally mounted to frame system 32. A frame extension 109 is rigidly attached to frame system 32. Attached to frame extension 109, to the rear of and elevated from spoiler 40, is a wing 110. Wing 110 is variably mounted as detailed elsewhere and acts to condition and control the air flow. Wing 110 may be installed to spoiler panel 40, second pivotal panel 38 or first pivotal panel 36. Left side panel 42 has a left portal 44 as previously disclosed. Hinge mounted to left side panel 42 is left side pivotal panel 50 which has closed position 54, shown in FIG. 7, and open position 56, shown in FIG. 8. Attached to left side panel 42 is a wing 112, either rigidly or variably, which acts to condition and control the air flow. Left segmented upper side pivotal panel 62 is hinge mounted to segmented air deflector 30 in close proximity to the trailing edge of left side panel 42. Left segmented upper side pivotal panel 62 has extended position 66, shown in FIG. 7, and retracted position 68, shown in FIG. 8. A primary surface 88 directs air flow to a sweeping trailing edge 92 which further directs air flow outwardly. Conditioning risers 96 act to straighten, and therefore condition, the air flow for better control. A secondary surface 90 extends inwardly and is bordered by sweeping trailing edges 94 which further direct air flow upwardly. Attached to left segmented upper side pivotal panel 62 is a wing 114, either rigidly or variably, which acts to condition and control the air flow. Left segmented lower side pivotal panel 74 is illustrated in spacial relationship to the installed positioning. A leading edge 98 is hinge mounted to the tractor as disclosed elsewhere. Left segmented lower side pivotal panel 74 has extended position 78, shown in FIG. 7, and retracted position 80, shown in FIG. 8. A conditioning surface 100 directs air flow to a primary surface 102 which directs air flow to a sweeping trailing edge 106 which further directs air flow outwardly. Conditioning risers 104 act to straighten, and therefore condition, the air flow for better control. Attached to left segmented lower side pivotal panel 74 is a wing 116, either rigidly or variably, which acts to condition and control the air flow.

Figure 9:
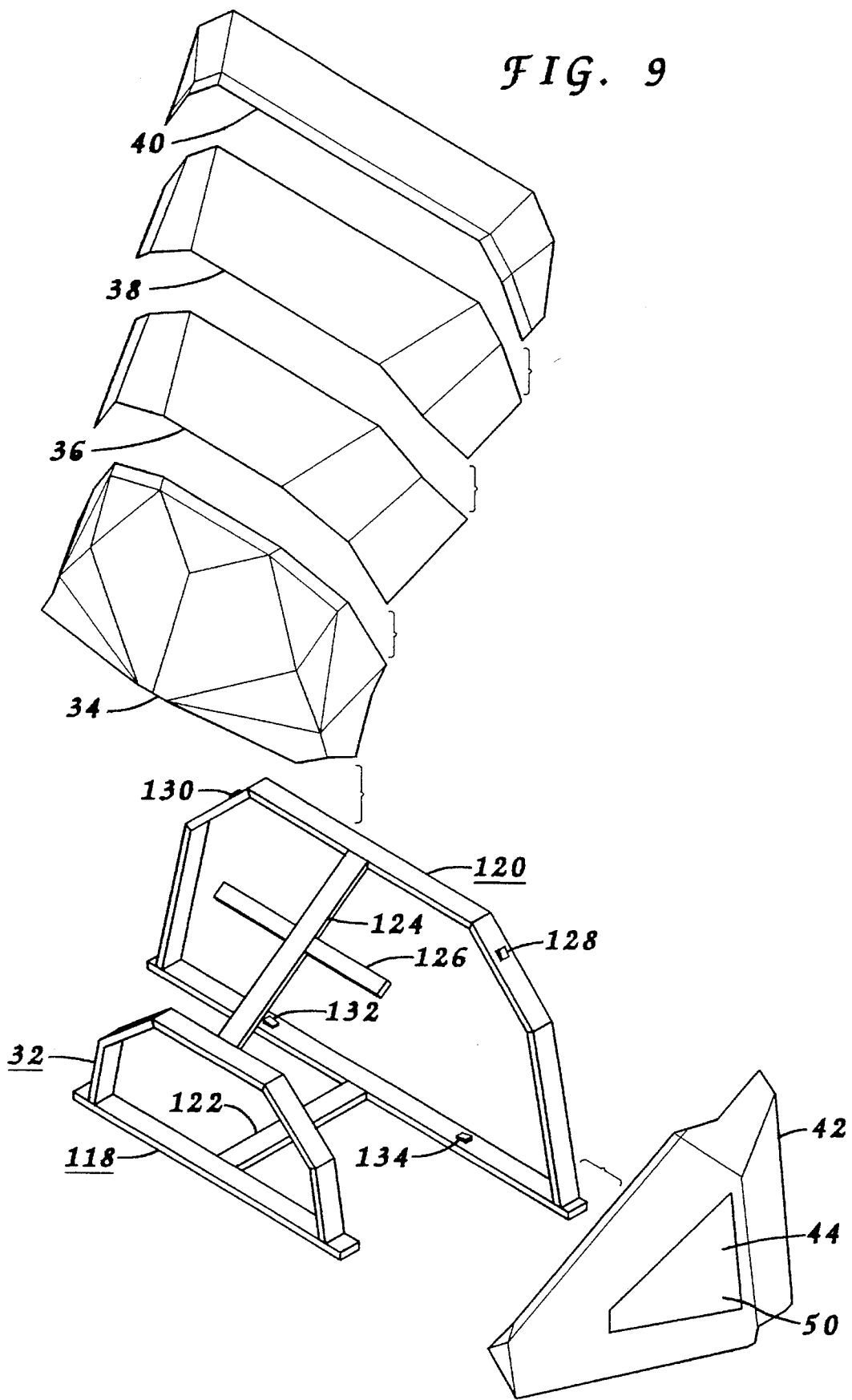
FIG. 9 is an exploded perspective view of a frame system with various panels detached.

FIG. 9 shows frame system 32 which comprises a front frame assembly 118 and a rear frame assembly 120 which are connected, one to the other, by a lower connecting member 122 and an upper connecting member 124. Upper connecting member 124 has attached thereto a cross member 126 for the mounting thereto of a pivotal panel as detailed elsewhere. A first left wind tab 128, a first right wind tab 130, a second left wind tab 132 and a second right wind tab 134 are each secured to rear frame assembly 120. As detailed elsewhere each wind tab has a function of measuring for wind presence from a specific direction of flow. The directional orientation of the various wind tabs refer to the direction from which the measured wind flow originates. Shown in lateral alignment to frame system 32 is left side panel 42 having a left portal 44 with left side pivotal panel 50 closing left portal 44. It being understood that an opposing right sided panel, corresponding to left side panel 42, would be installed on the opposing side of frame system 32. Front panel 34, first pivotal panel 36, second pivotal panel 38 and spoiler panel 40 are shown in elevational alignment to frame system 32. Following rigid installation of left side panel 42 to frame system 32 front panel 34 would be rigidly installed to front frame assembly 118 of frame system 32 overlapping left side panel 42. First pivotal panel 36 is pivotally secured to cross member 126 of frame system 32 utilizing hinges as disclosed elsewhere. Second pivotal panel 38 is rigidly secured to spoiler panel 40 and the combination is pivotally secured to rear frame assembly 120 of frame system 32 utilizing hinges as disclosed elsewhere. Thus has been disclosed the orientation of the various panels forming the segmented air deflector.

Figure 10:
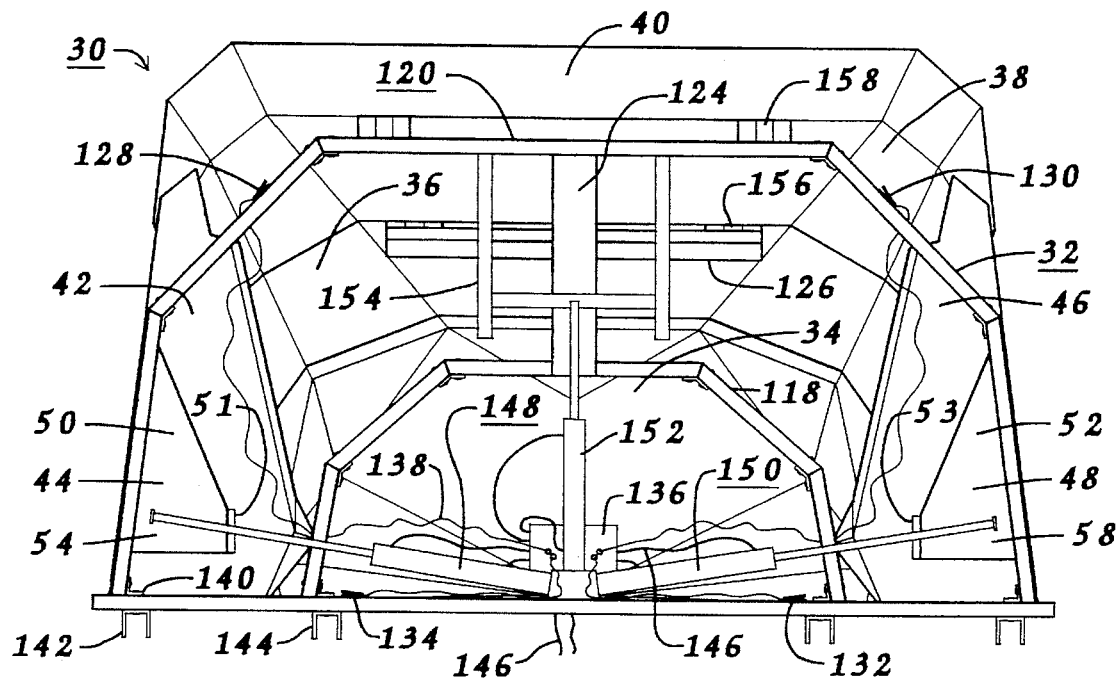
FIG. 10 is a rear plan view of a segmented air deflector with the various panels in the closed positions.
Figure 11:
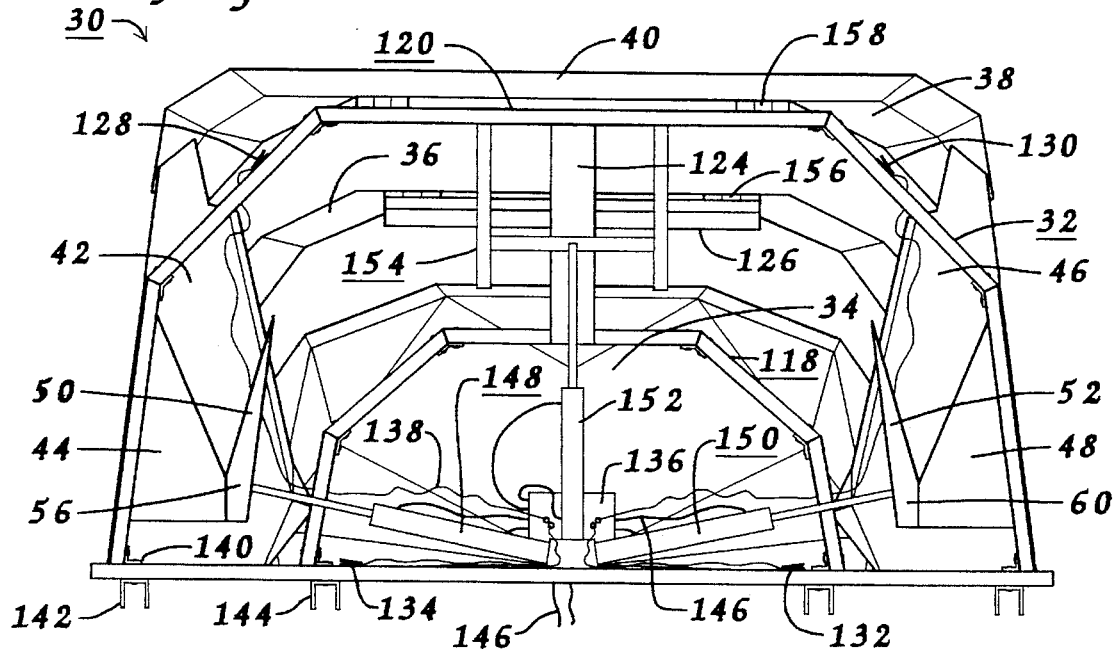
FIG. 11 is a view as illustrated in FIG. 10 with the various panels in the open positions.

FIG. 10 and FIG. 11 illustrate the mechanical components utilized to operate segmented air deflector 30. Front frame assembly 118 and rear frame assembly 120 are each formed of various framing material rigidly secured together by brackets 140 and are connected one to the other by lower connecting member, not shown, and upper connecting member 124. Securely attached to opposing lower corners of front frame assembly 118 are a pair of front mounting brackets 144. Securely attached to opposing lower corners of rear frame assembly 120 are a pair of rear mounting brackets 142. Rear mounting brackets 142 and front mounting brackets 144 cooperate to secure segmented air deflector 30 to tractor 300 as illustrated in FIG. 1 through FIG. 6 and known in the art. Front panel 34 is shown secured to frame system 32. First pivotal panel 36 is secured to cross member 126 utilizing hinges 156 and connected to a coupling unit 154. Spoiler panel 40 is securely attached to second pivotal panel 38 and the combination is secured to rear frame assembly 120 utilizing hinges 158 and connected to coupling unit 154. Coupling unit 154 provides for synchronized transfer of first pivotal panel 36 and second pivotal panel 38, with spoiler panel 40, between a closed position, shown in FIG. 10, and an open position, shown in FIG. 11. Left side panel 42 is secured to frame system 32 and has a left portal 44 being an opening therein. Substantially filling left portal 44 is left side pivotal panel 50 which is secured to left side panel 42 utilizing a hinge 51. Left side pivotal panel has opposing positions being closed position 54, shown in FIG. 10 and open position 56, shown in FIG. 11. Closed position 54 prevents the free passage of air flow through left portal 44 while open position 56 permits the free passage of air flow through left portal 44. Right side panel 46 is secured to frame system 32 and has a right portal 48 being an opening therein. Substantially filling right portal 48 is right side pivotal panel 52 which is secured to right side panel 46 utilizing a hinge 53. Right side pivotal panel 52 has opposing positions being closed position 58, shown in FIG. 10 and open position 60, shown in FIG. 11. Closed position 58 prevents the free passage of air flow through right portal 48 while open position 60 permits the free passage of air flow through right portal 48. First left wind tab 128 is secured to frame system 32 in a location which permits measurement of wind velocity originating from a desired angular direction on the left side of segmented air deflector 30 during usage. First right wind tab 130 is secured to frame system 32 in a location which permits measurement of wind velocity originating from a desired angular direction of the right side of segmented air deflector during usage. Second left wind tab 132 is secured to frame system 32 in a location which permits measurement of wind velocity entering left portal 44 while left side pivotal panel 50 is in open position 56.

Second right wind tab 134 is secured to frame system 32 in a location which permits measurement of wind velocity entering right portal 48 while right side pivotal panel 52 is in open position 60. First left wind tab 128, first right wind tab 130, second left wind tab 132 and second right wind tab 134 transfers such findings separately to a control panel 136 utilizing wires 138. Control panel 136 is secured to lower connecting member, not shown, and receives air pressure through air lines 146. Control panel 136 receives signals from the various wind tabs and acts upon those signal as detailed elsewhere. A left pneumatic drive 148 controls transfer of left side pivotal panel 50 between closed position 54 and open position 56. A right pneumatic drive 150 controls transfer of right side pivotal panel 52 between closed position 58 and open position 60. A main pneumatic drive 152 acts upon coupling unit 154 to transfer first pivotal panel 36, second pivotal panel 38 and spoiler panel 40 between the closed position, shown in FIG. 10, and the open position, shown in FIG. 11. Control panel 136 similarly controls the various drive means controlling the respective segmented upper side pivotal panels and the respective segmented lower side pivotal panels as well as the electrical operation of the variable wing members as detailed elsewhere.

Figure 12:
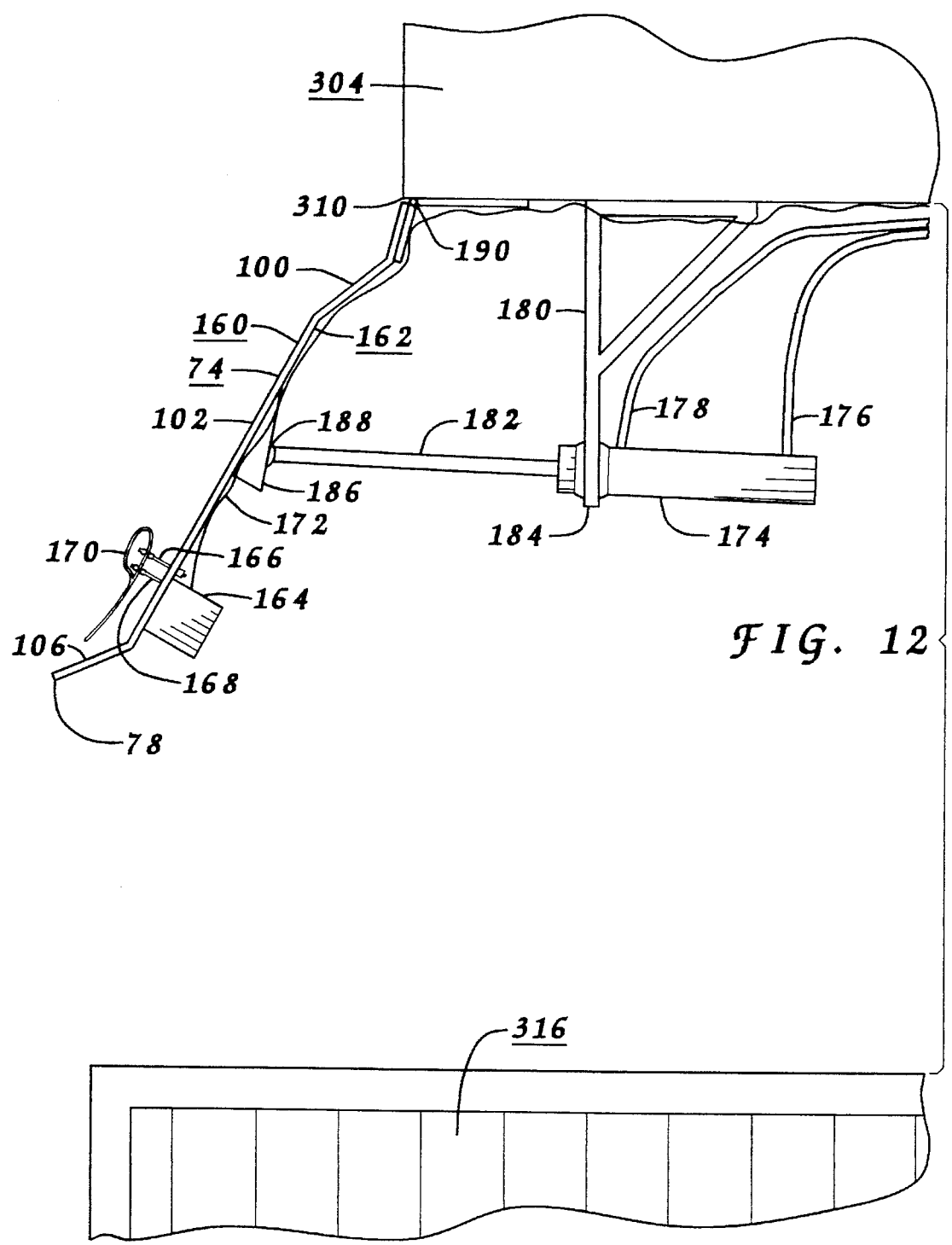
FIG. 12 is an overhead plan view of a left segmented lower pivotal panel in the extended position with a variable wing member attached.
Figure 13:
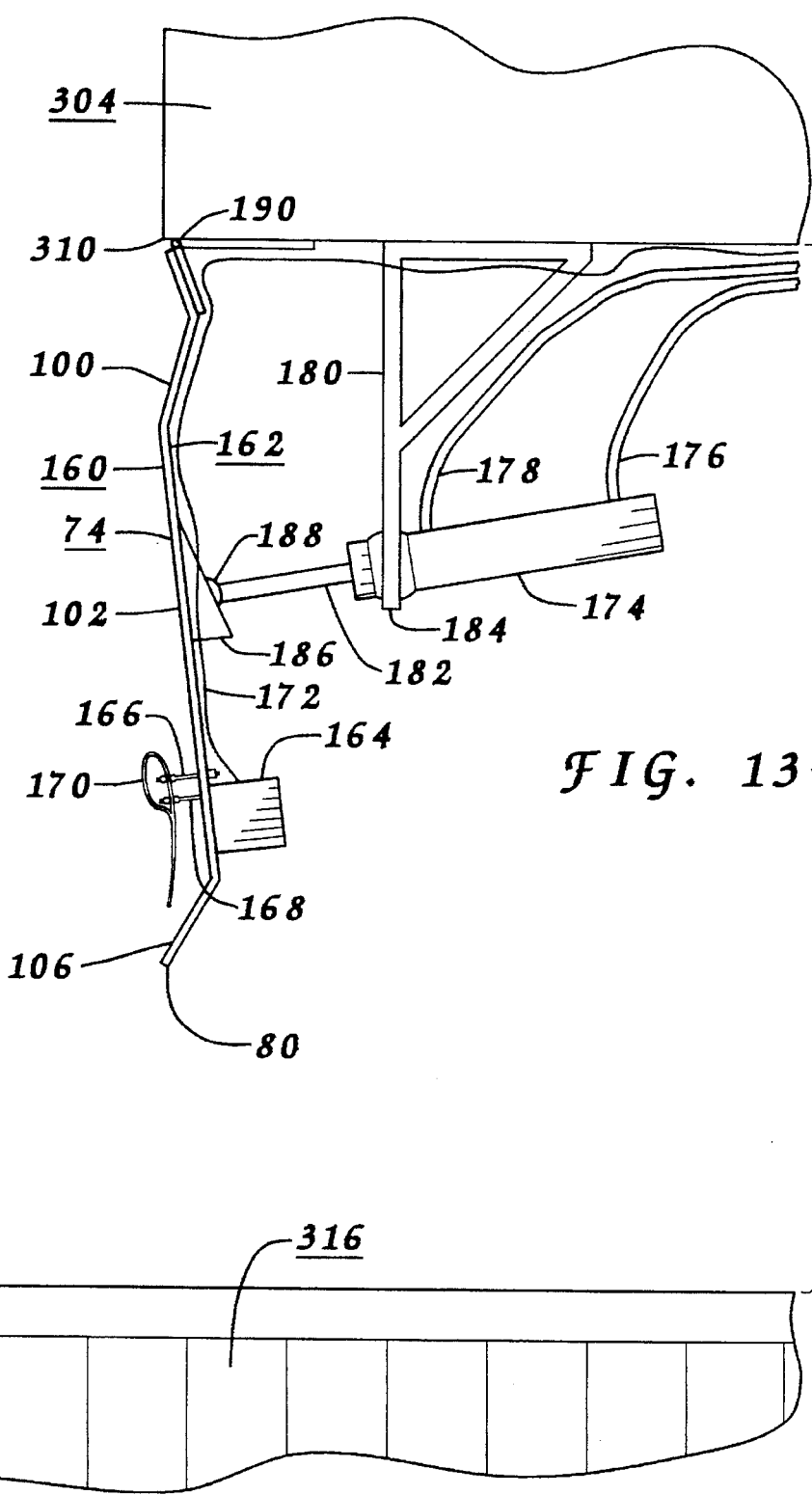
FIG. 13 is a view as illustrated in FIG. 12 with the panel in the retracted position.

FIG. 12 and FIG. 13 depict the structural installation and the mechanical operation of left segmented lower side pivotal panel 74. Identical adaptation is employed, with a reversal of structure, to install and operate right segmented lower side pivotal panel 64, illustrated in FIG. 1 through FIG. 6. Similar mechanical operation is employed to operate left and right segmented upper side pivotal panels 62 and 64 similarly illustrated in FIG. 1 through FIG. 6 with mounting taking place to either frame system 32 or left and right side panels 42 and 46. Left segmented lower side pivotal panel 74 is pivotally mounted to tractor housing 304 in close proximity to left rear vertically oriented trailing edge 310 utilizing hinge 190. Hinge 190 preferably extends the length of left segmented lower side pivotal panel 74 although multiple hinges 190 may be deployed in spaced relationship along such length. A bracket 180 is securely mounted to tractor housing 304. Bracket 180 has a pivotal connection 184 which secures a pneumatic drive 174 having a linkage 182. Pneumatic drive 174 is adaptable to extend and retract linkage 182 utilizing air pressure supplied through air line 176 and air line 178. Linkage 182 terminates distal from pneumatic drive 174 in a connector 188 which is seated in a attachment coupling 186. Attachment coupling 186 is secured to left segmented lower side pivotal panel 74 as conventionally known in the art. Left segmented lower side pivotal panel 74 has extended position 78, shown in FIG. 12, and retracted position 80, shown in FIG. 13. Pneumatic drive 174 causes transfer of left segmented lower side pivotal panel 74 between extended position 78 and retracted position 80. Left segmented lower side pivotal panel 74 has an outer surface 160 and an inner surface 162. Outer surface 160 is comprised of conditioning surface 100 which transfers air flow to primary surface 102 which transfers air flow to sweeping trailing edge 106 to direct air flow around trailer 316 when in extended position 78. Attached to inner surface 162 is a solenoid 164, which is electrically operated utilizing wire 172, which causes extension and retraction of a solenoid linkage 168. A wing 170 is pivotally extended from outer surface 160 by a extending pivotal support member 166 and thus secured to left segmented lower side pivotal panel 74. Wing 170 is coupled to solenoid linkage 168 and thus is pivotally movable by solenoid 164 relative to outer surface 160. It being understood the a plurality of extending pivotal support members 166 would be deployed in spaced relationship along the length of wing 170.

FIG. 14 and FIG. 15 show wing 170 attached to outer surface 160 of left segmented lower side pivotal panel 74 utilizing extending pivotal support member 166. Solenoid linkage 168 is terminally attached to wing 170 spaced laterally from extending pivotal support member 166. In this particular embodiment wing 170 has an interior 210 wherein such attachment terminate. Solenoid linkage 168 is controllable by solenoid 164, which is electrical and controlled by wire 172. Wing 170 has a leading edge 198 and a trailing edge 200. A convex surface 202 extends between leading edge 198 and trailing edge 200 adjacent to outer surface 160. An opposing convex surface 202 extends from leading edge 198 and terminates in a transition surface 206, which is concave in shape, which terminates in a concave surface 208 which extends to trailing edge 200. Wing 170 has a retracted position 194, shown in FIG. 14 and an extended position 196, shown in FIG. 15 and represents a range of pivotal motion. Retracted position 194 places trailing edge 200 at the closest measurement to outer surface 160 of the range of motion while extended position 196 places trailing edge 200 at the farthest distance to outer surface 160 of the range of motion. It being understood that such variable operation of wing 170 is applicable to all wings disclosed regardless of the specific panel installed upon. Generally the particular wing would be in the extended position when the carrier panel is in its respective extended position or closed position and in the retracted position when the carrier panel is in its respective retracted position or open position. While the orientation of wing 170 illustrates the preferred installation, certain installations, depending upon location of installation, may place wing 170 reversed with convex surface 202 away from the attachment surface. A flexible extension member 192, preferably made of a rubberized material, is shown installed to the terminal end of left segmented lower side pivotal panel 74. It being understood that flexible extension member 192 would also be install on right segmented lower side pivotal panel and would extend the length of the respective panel. Protection during contact with other objects, for both the panel and the impacting object, is provided.

FIG. 16 and FIG. 17 show a wind tab 212 comprising a base 222 and a cover 224. Cover 224 is mounted to base 222 utilizing a hinge 220 and held elevated by a spring 232. Base 222 has attached adjacent cover 224 a first contact 216. Cover 224 has attached adjacent to base 222 a second contact 218. First contact 216 and second contact 218 have a normal position, based on resistance of spring 232, of being out of contact, one to the other. Cover 224 has a pivotal extension 228 incorporated therein. Pivotal extension 228 is angularly adjustable relative to cover 224 and fixable to a desired angular offset by an adjustment set 226. Pivotal extension 228 has a contact surface 230 which in use is deployed to measure air flow. When a predetermine air flow pressure is applied to contact surface 230 cover 224 is forced downward and second contact 218 comes into contact with first contact 216 and such contact, and therefore indication of the predetermined air flow pressure, is transferred via a wire 214. It being understood that the various wind tabs, 128, 130, 132 and 134 shown in FIG. 9, FIG. 10 and FIG. 11 are similarly constructed.

FIG. 18 and FIG. 19 illustrate a segmented air deflector 31 comprised of a segmented air deflector panel 41, being a single piece, and a left side panel 42. It being understood that a panel would enclose the right side of segmented air deflector 31, as detailed elsewhere. Segmented air deflector panel 41 and left side panel 42 are rigidly attached to frame system 32. Left side panel 42 has left portal 44 with left side pivotal panel 50 hingedly mounted as detailed elsewhere. Thus it can be understood that a segmented air deflector having cross wind panels incorporated therein can be constructed of fewer segmented panels without pivotal panels transversely mounted therein.

Figure 20:
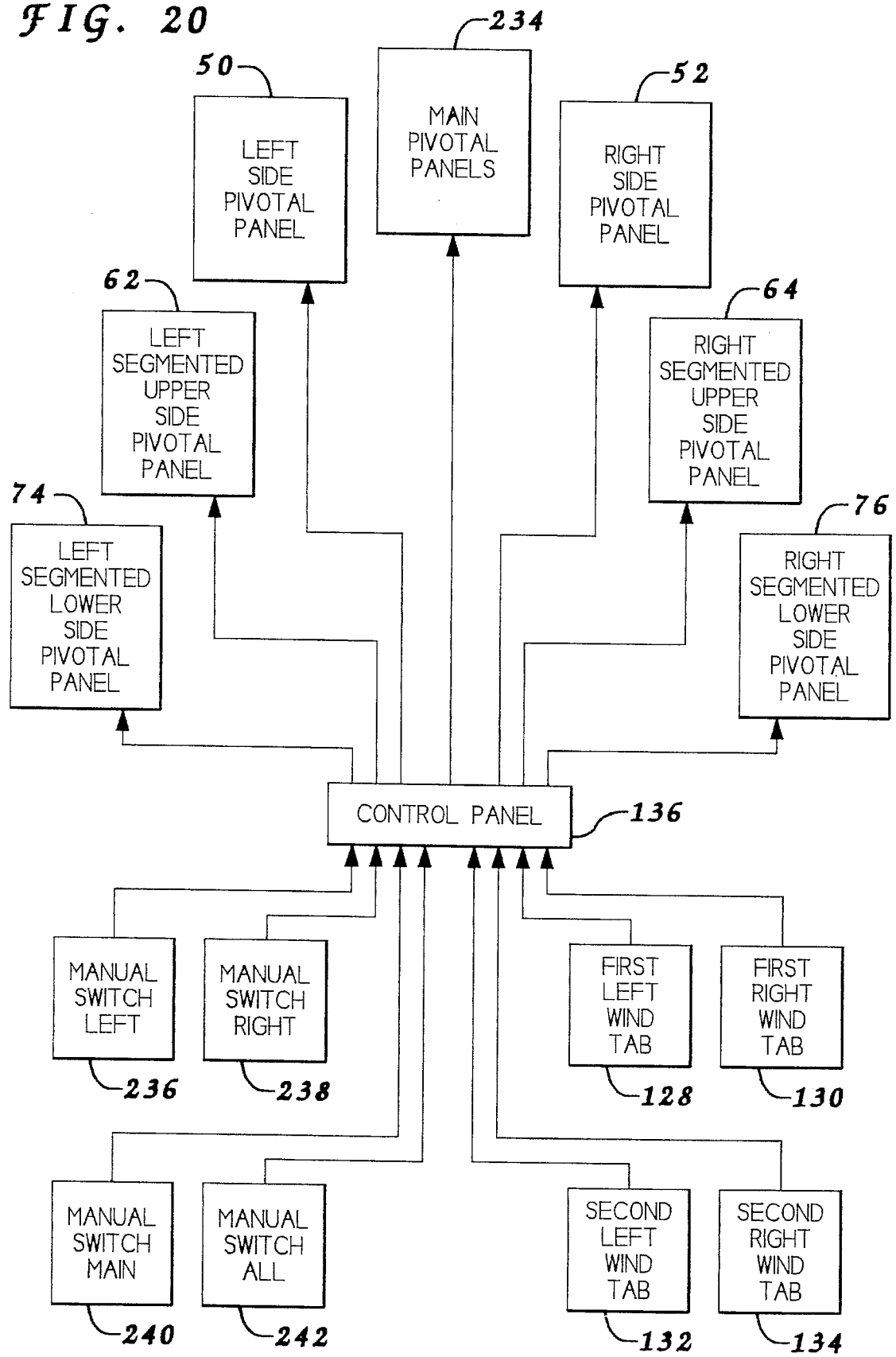
FIG. 20 is flow chart illustrating the activation sequences to control the various panels.

FIG. 20 illustrates, with graphical representations, two possible adaptations of controlling the various panels. It being understood that several combinations exist. It being understood that left side pivotal panel 50, right side pivotal panel 52, first left wind tab 128 and first right wind tab 130 are required to practice the invention. It being understood that each panel, or panel group in the case of main pivotal panels 234, has opposing positions, being either extended and retracted or closed and open, as detailed elsewhere. Control panel 136 receives input from various sources, as detailed below, and causes transfer of the various individual panels. It being further understood that the various variable wings would be transferred simultaneously with the respective panel associated therewith. The preferred mechanical structure has the panels being transferred between their opposing positions by pneumatic drives while the variable wings are transferred between their opposing positions by electric solenoids. It is understood that control panel 136 encompasses the physical structure to facilitate such transfers as is conventionally known in the art. Main pivotal panels 234 are hereby disclosed as referring to first pivotal panel 36 and second pivotal panel 38 with spoiler panel 40 attached thereto or their equivalents. While two pivotal panels have been disclosed other combinations exist depending upon specific requirements of the subject vehicle. Tractors with sleeper compartments would accept segmented air deflectors have a greater longitudinal length than the unit illustrated herein. During normal conditions control panel 136 places main pivotal panels 234 in their closed position, left side pivotal panel 50 and right side pivotal panel 52 in their closed positions, left segmented upper side pivotal panel 62, right segmented upper side pivotal panel 64, left segmented lower side pivotal panel 74 and right segmented lower side pivotal panel 76 in their extended positions. This provides for a streamlining of the vehicle and reduces drag during motion. The following description of activation places all panels originally in the positions detailed above for normal conditions. It being understood that when the various signals indicated below stop being sent to control panel 136, control panel 136 will cause the effected panel or panels to be returned to their respective normal condition positions. Manual switch left 236, manual switch right 238, manual switch main 240 and manual switch all 242 are each a physical switch located in the operator compartment of tractor 300, shown in FIG. 1 through FIG. 6, and are activated and deactivated by the vehicle operator. Such switches being conventionally known in the art. Activation of manual switch left 236 causes control panel 136 to cause left side pivotal panel 50 to open. Activation of manual switch right 238 causes control panel 136 to cause right side pivotal panel 52 to open. Activation of manual switch main 240 causes control panel 136 to cause main pivotal panels 234 to open. Manual switch all 242 causes control panel 136 to cause all panels to move to their respective open positions or retracted positions. The activation of manual switches provides the operator with selective deployment options. Automatic control of the panels to compensate for cross wind conditions is the principle feature of the invention. Activation of first left wind tab 128, caused by a predetermined air flow velocity indicating the presence of left side cross winds, causes control panel 136 to cause left side pivotal panel 50 to open. This position permits some of the cross wind to pass through the segmented air deflector and exit on the opposing side between the tractor and the trailer thus reducing the effects of the cross wind. Activation of first right wind tab 130, caused by a predetermined air flow velocity indication the presence of right side cross winds, causes control panel 136 to cause right side pivotal panel 52 to open. This position permits some of the cross wind to pass through the segmented air deflector and exit on the opposing side between the tractor and the trailer thus reducing the effects of the cross wind. It being understood that second left wind tab 132 and second right wind tab 134 are physically positioned in such a manner that under normal conditions activations may only occur as a result of air flowing through the respective left side pivotal panel 50 or right side pivotal panel 52. It further being understood that the predetermined air flow velocity required to activate either second left wind tab 132 or second right wind tab 134 indicates a heightened presence of cross wind conditions beyond that required to respectively activate first left wind tab 128 or first right wind tab 130. Activation of second left wind tab 132 causes control panel 136 to cause main pivotal panels 234 to be placed in their open position and left segmented upper side pivotal panel 62 and left segmented lower side pivotal panel 74 to be placed in their respective retracted positions. It being understood that left side pivotal panel 50 would be in open position as required for activation of second left wind tab 132. These positions permits some of the cross wind to pass through the segmented air deflector or behind left segmented upper side pivotal panel 62 and left segmented lower side pivotal panel 74 and exit on the opposing side between the tractor and the trailer thus reducing the effects of the cross wind. Activation of second right wind tab 134 causes control panel 136 to cause main pivotal panels 234 to be placed in their open position and right segmented upper side pivotal panel 64 and right segmented lower side pivotal panel 76 to be placed in their respective retracted positions. It being understood that right side pivotal panel 52 would be in open position as required for activation of second right wind tab 134. These positions permits some of the cross wind to pass through the segmented air deflector or behind right segmented upper side pivotal panel 64 and right segmented lower side pivotal panel 76 and exit on the opposing side between the tractor and the trailer thus reducing the effects of the cross wind. In the second adaptation main pivotal panels 234 are not installed, rather the panel or panels corresponding to their structure are rigidly mounted rather than pivotally mounted. Additionally only one wind tab, or measuring means, is deployed per side, being left and right. When first left wind tab 128 is activated, control panel 136 causes left side pivotal panel 50, and if installed left segmented upper side pivotal panel 62 and if installed left segmented lower side pivotal panel 74 to be transferred to their respective alternating positions. When first right wind tab 130 is activated, control panel 136 causes right side pivotal panel 52, and if installed right segmented upper side pivotal panel 64 and if installed right segmented lower side pivotal panel 76 to be transferred to their respective alternating positions.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

I claim:

1. Cross wind conditioning means to provide for a selective redirection of air flow to reduce the effect of cross winds on a tractor, the tractor adaptable to tow a trailer, the tractor and the trailer forming a tractor trailer combination, the tractor having a roof area, a direction of forward travel, a left and right directional orientation corresponding to a position facing forward in the direction of forward travel of the tractor, an imaginary center line extending through the tractor corresponding to the direction of forward travel, a tractor housing, a left rear vertically oriented trailing edge of the tractor housing, a right rear vertically oriented trailing edge of the tractor housing, the trailer having a forward face, the forward face having a perimeter formed by an upper edge, a right side edge, a left side edge and a lower edge, the right side edge and the left side edge both corresponding to a directional orientation facing forward in the direction of forward travel of the tractor, the cross wind conditioning means comprising:

a) a segmented air deflector attachable to the roof area of the tractor, the segmented air deflector having a directional orientation following attachment, the directional orientation including left, right, forward and rear and corresponding to the directional orientation of the tractor, the segmented air deflector having a left side, a right side, a forward edge, a rear upper edge, a left rear vertically oriented trailing edge and a right rear vertically oriented trailing edge all corresponding to the directional orientation of the segmented air deflector following attachment, the segmented air deflector comprising:

1) a frame system;

2) a plurality of segmented panels attached to the frame system, each segmented panel having a plurality of planar outer surfaces with a linear juncture between adjoining surfaces, the segmented air deflector having alternating positions being a closed position and an open position, the closed position providing characteristics to stream line air flow around the trailer during motion of the tractor trailer combination to reduce drag, the closed position having a continuous segmented surface area formed by the plurality of segmented panels, the open position placing at least one of the segmented panels in a moved position to cause redirection of the air flow during motion of the tractor trailer combination to cause the air flow to impinge the forward face of the trailer to exert a braking force on the tractor trailer combination;

3) a drive means to provide for a selective movement of at least one of the segmented panels to transfer the segmented air deflector between the alternating positions;

b) a left side panel mounted on the left side of the segmented air deflector and having a substantially vertical orientation between the roof area of the tractor and the continuous segmented surface area of the segmented air deflector while the segmented air deflector is in the closed position, the left side panel having a left portal;

c) a right side panel mounted on the right side of the segmented air deflector and having a substantially vertical orientation between the roof area of the tractor and the continuous segmented surface area of the segmented air deflector while the segmented air deflector is in the closed position, the right side panel having a right portal;

d) a left side pivotal panel pivotally mounted on the left side panel and substantially filling the left portal, the left side pivotal panel having alternating positions, the alternating positions being a closed position and an open position, the closed position prohibiting entry of air flow through the left portal, the open position allowing entry of air flow through the left portal;

e) a right side pivotal panel pivotally mounted on the right side panel and substantially filling the right portal, the right side pivotal panel having alternating positions, the alternating positions being a closed position and an open position, the closed position prohibiting entry of air flow through the right portal, the open position allowing entry of air flow through the right portal;

f) a first left drive means to provide for a selective transfer of the left side pivotal panel between the alternating positions;

g) a first right drive means to provide for a selective transfer of the right side pivotal panel between the alternating positions;

h) a first left side measuring means to provide for determining a predetermined presence of cross wind conditions on the left side of the tractor trailer combination;

i) a first right side measuring means to provide for determining a predetermined presence of cross wind conditions on the right side of the tractor trailer combination;

j) a first left control means to provide for continually testing the first left side measuring means to determine a change in status, the change in status being alternatively between a measurement below the predetermined presence of cross wind conditions and a measurement above the predetermined presence of cross wind conditions, the change in status causing activation of the first left drive means to transfer the left side pivotal panel between the alternating positions;

k) a first right control means to provide for continually testing the first right side measuring means to determine a change in status, the change in status being alternatively between a measurement below the predetermined presence of cross wind conditions and a measurement above the predetermined presence of cross wind conditions, the change in status causing activation of the first right drive means to transfer the right side pivotal panel between the alternating positions;

whereby the respective first measuring means would signal a change in status of cross wind conditions and the respective first control means would cause the respective first drive means to cause the respective side pivotal panels to be placed in one of the alternating position closed when cross wind conditions are not present on that respective side and open when cross wind conditions are present on that respective side.

2. The cross wind conditioning means defined in claim 1 further comprising:

a) a wing member having:
1) a leading edge;
2) a trailing edge;
3) a first surface having a convex shape and extending from the leading edge to the trailing edge;
4) a second surface comprising:
a) an opposing convex surface extending from the leading edge on an opposing side from the first surface;
b) a transition surface being concave shaped;
c) a concave surface extending from the transition surface to the trailing edge, the transition surface being between the opposing convex surface and the concave surface;

b) attachment means to provide for elevated placement of the wing member above an attachment surface, the attachment surface an exposed surface of the segmented air deflector;

whereby the wing member is attached to the segmented air deflector and provides additional conditioning of the air flow.

3. The cross wind conditioning means defined in claim 2 further comprising pivotal variation means to provide for a selective alteration of an angle of attack of the wing member to aid in conditioning of the air flow.

4. The cross wind conditioning means defined in claim 1 further comprising:

a) a second left side measuring means to provide for determining a predetermined presence of cross wind conditions on the left side of the tractor trailer combination, the predetermined presence of cross wind conditions of the second left side measuring means requiring a greater presence of cross wind conditions than the predetermined presence of cross wind conditions of the first left side measuring means;

b) a second right side measuring means to provide for determining a predetermined presence of cross wind conditions on the right side of the tractor trailer combination, the predetermined presence of cross wind conditions of the second right side measuring means requiring a greater presence of cross wind conditions than the predetermined presence of cross wind conditions of the first right side measuring means;

c) a second left control means to provide for continually testing the second left side measuring means to determine a change in status, the change in status being alternatively between a measurement below the predetermined presence of cross wind conditions and a measurement above the predetermined presence of cross wind conditions, the change in status causing activation of the drive means of the segmented air deflector to transfer the segmented air deflector between the alternating positions;

d) a second right control means to provide for continually testing the second right side measuring means to determine a change in status, the change in status being alternatively between a measurement below the predetermined presence of cross wind conditions and a measurement above the predetermined presence of cross wind conditions, the change in status causing activation of the drive means of the segmented air deflector to transfer the segmented air deflector between the alternating positions;

whereby the respective secondary measuring means would signal a change in status of cross wind conditions and the respective secondary control means would cause the segmented panel of the segmented air deflector to be placed in one of the alternating positions, the segmented air deflector in the open position when the measurement of cross wind conditions as measured by the second left or right measuring means are above the predetermined presence of cross wind conditions.

5. The cross wind conditioning means defined in claim 4 further comprising:
   a) a left segmented upper side pivotal panel pivotally mounted on the left rear vertically oriented trailing edge of the segmented air deflector, the left segmented upper side pivotal panel having a substantially vertical orientation extending rearward from the segmented air deflector, the left segmented upper side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the left segmented upper side pivotal panel away from the imaginary center line of the tractor, the extended position providing characteristics to stream line air flow around the trailer during motion of the tractor trailer combination to reduce drag, the retracted position placing the rearward trailing edge near the imaginary center line of the tractor, the retracted position causing redirection of the air flow during motion of the tractor trailer combination to cause the air flow to pass between the tractor and the trailer;
   b) a right segmented upper side pivotal panel pivotally mounted on the right rear vertically oriented trailing edge of the segmented air deflector, the right segmented upper side pivotal panel having a substantially vertical orientation and extending rearward from the segmented air deflector, the right segmented upper side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the right segmented pivotal panel away from the imaginary center line of the tractor, the extended position providing characteristics to stream line air flow around the trailer during motion of the tractor trailer combination to reduce drag, the retracted position placing the rearward trailing edge of the right segmented upper side pivotal panel near the imaginary center line of the tractor, the retracted position causing redirection of the air flow during motion of the tractor trailer combination to cause the air flow to pass between the tractor and the trailer;
   c) a second left drive means to provide for a selective transfer of the left segmented upper side pivotal panel between the alternating positions;
   d) a second right drive means to provide for a selective transfer of the right segmented upper side pivotal panel between the alternating positions;
   e) and wherein the second left control means further provides for activation of the second left drive means to transfer the left segmented upper side pivotal panel between the alternating positions;
   f) and wherein the second right control means further provides for activation of the second right drive means to transfer the right segmented upper side pivotal panel between the alternating positions;
whereby the respective secondary measuring means would signal a change in status of cross wind conditions and the respective control means would cause the respective second drive means to cause the respective segmented upper side extending panels to be placed in one of the alternating position.

6. The cross wind conditioning means defined in claim 5 further comprising:
   a) a wing member having:
      1) a leading edge;
      2) a trailing edge;
      3) a first surface convex shaped and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
      b) attachment means to provide for elevated placement of the wing member above an attachment surface, the attachment surface an exposed surface of the segmented air deflector;
whereby the wing member provides additional conditioning of the air flow.

7. The cross wind conditioning means defined in claim 6 further comprising pivotal variation means to provide for a selective alteration of an angle of attack of the wing member to aid in conditioning of the air flow.

8. The cross wind conditioning means defined in claim 4 further comprising:
   a) a left segmented lower side pivotal panel pivotally mounted on the left rear vertically oriented trailing edge of the tractor housing, the left segmented lower side pivotal panel having a substantially vertical orientation and extending rearward from the tractor housing, the left segmented lower side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the left segmented lower side pivotal panel away from the imaginary center line of the tractor, the extended position providing characteristics to stream line air flow around the trailer during motion of the tractor trailer combination to reduce drag, the retracted position placing the rearward trailing edge of the left segmented lower side pivotal panel near the imaginary center line of the tractor, the retracted position causing redirection of the air flow during motion of the tractor trailer combination to cause the air flow to pass between the tractor and the trailer;
   b) a right segmented lower side pivotal panel pivotally mounted on the right rear vertically oriented trailing edge of the tractor housing, the right segmented lower side pivotal panel having a substantially vertical orientation and extending rearward from the tractor housing, the right segmented lower side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the right segmented lower side pivotal panel away from the imaginary center line of the tractor, the extended position providing characteristics to stream line air flow around the trailer during motion of the tractor trailer combination to reduce drag, the retracted position placing the rearward trailing edge of the right segmented lower side pivotal panel near the imaginary center line of the tractor, the retracted position causing redirection of the air flow during motion of the tractor trailer combination to cause the air flow to pass between the tractor and the trailer;

c) a third left drive means to provide for a selective transfer of the left segmented lower side pivotal panel between the alternating positions;

d) a third right drive means to provide for a selective transfer of the right segmented lower side pivotal panel between the alternating positions;

e) and wherein the second left control means further provides for activation of the third left drive means to transfer the left segmented lower side pivotal panel between the alternating positions;

f) and wherein the second right control means further provides for activation of the third right drive means to transfer the right segmented lower side pivotal panel between the alternating positions;

whereby the respective second measuring means would signal a change in status of cross wind conditions and the respective second control means would cause the respective third drive means to cause the respective segmented lower side extending panels to be placed in one of the alternating positions.

9. The cross wind conditioning means defined in claim 8 further comprising:
a) a wing member having:
1) a leading edge;
2) a trailing edge;
3) a first surface convex shaped and extending from the leading edge to the trailing edge;
4) a second surface comprising:
a) an opposing convex surface extending from the leading edge on an opposing side from the first surface;
b) a transition surface being concave shaped;
c) a concave surface extending from the transition surface to the trailing edge, the transition surface being between the opposing convex surface and the concave surface;
b) attachment means to provide for elevated placement of the wing member above an attachment surface;
whereby the wing member provides additional conditioning of the air flow.

10. The cross wind conditioning means defined in claim 9 further comprising pivotal variation means to provide for a selective alteration of an angle of attack of the wing member to aid in conditioning of the air flow.

11. Cross wind conditioning means to provide for a selective redirection of air flow to reduce the effect of cross winds on a tractor, the tractor adaptable to tow a trailer, the tractor and the trailer forming a tractor trailer combination, the tractor having a roof area, a direction of forward travel, a left and right directional orientation corresponding to a position facing forward in the direction of forward travel of the tractor, an imaginary center line extending through the tractor corresponding to the direction of forward travel, a tractor housing, a left rear vertically oriented trailing edge of the tractor housing, a right rear vertically oriented trailing edge of the tractor housing, the trailer having a forward face, the forward face having a perimeter formed by an upper edge, a right side edge, a left side edge and a lower edge, the right side edge and the left side edge both corresponding to a directional orientation facing forward in the direction of forward travel of the tractor, the cross wind conditioning means comprising:

a) a segmented air deflector attachable to the roof area of the tractor, the segmented air deflector having a directional orientation following attachment, the directional orientation including left, right, forward and rear and corresponding to the directional orientation of the tractor, the segmented air deflector having a left side, a right side, a forward edge, a rear upper edge, a rear lower edge, a left rear vertically oriented trailing edge and a right rear vertically oriented trailing edge all corresponding to the directional orientation of the segmented air deflector following attachment, the segmented air deflector comprising:
1) a frame system;
2) at least one segmented panel attached to the frame system and forming a continuous segmented outer surface area, the continuous segmented outer surface area divided into a plurality of flat planar surfaces with a linear juncture between adjoining surfaces;

b) a left side panel mounted on the left side of the segmented air deflector and having a substantially vertical orientation between the roof area of the tractor and the continuous segmented surface area of the segmented air deflector, the left side panel having a left portal;

c) a right side panel mounted on the right side of the segmented air deflector and having a substantially vertical orientation between the roof area of the tractor and the continuous segmented surface area of the segmented air deflector, the right side panel having a right portal;

d) a left side pivotal panel pivotally mounted on the left side panel and substantially filling the left portal, the left side pivotal panel having alternating positions, the alternating positions being a closed position and an open position, the closed position prohibiting entry of air flow through the left portal, the open position allowing entry of air flow through the left portal;

e) a right side pivotal panel pivotally mounted on the right side panel and substantially filling the right portal, the right side pivotal panel having alternating positions, the alternating positions being a closed position and an open position, the closed position prohibiting entry of air flow through the right portal, the open position allowing entry of air flow through the right portal;

f) a first left drive means to provide for a selective transfer of the left side pivotal panel between the alternating positions;

g) a first right drive means to provide for a selective transfer of the right side pivotal panel between the alternating positions;

h) a first left side measuring means to provide for determining a predetermined presence of cross wind conditions on the left side of the tractor trailer combination;

i) a first right side measuring means to provide for determining a predetermined presence of cross wind conditions on the right side of the tractor trailer combination;

j) a first left control means to provide for continually testing the first left side measuring means to determine a change in status, the change in status being alternatively between a measurement below the predetermined presence of cross wind conditions and a measurement above the predetermined presence of cross wind conditions, the change in status causing activation of the first left drive means to transfer the left side pivotal panel between the alternating positions;

k) a first right control means to provide for continually testing the first right side measuring means to determine a change in status, the change in status being alternatively between a measurement below the predetermined presence of cross wind conditions and a measurement above the predetermined presence of cross wind conditions, the change in status causing activation of the first right drive means to transfer the right side pivotal panel between the alternating positions;

whereby the respective first measuring means would signal a change in status of cross wind conditions and the respective first control means would cause the respective first drive means to cause the respective side pivotal panel to be placed in one of the alternating positions, closed when cross wind conditions are not present on that respective side and open when cross wind conditions are present on that respective side.

12. The cross wind conditioning means defined in claim 11 further comprising:
   a) a wing member having:
      1) a leading edge;
      2) a trailing edge;
      3) a first surface convex shaped and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface, the attachment surface an exposed surface of the segmented air deflector;

whereby the wing member is attached to the segmented air deflector and provides additional conditioning of the air flow.

13. The cross wind conditioning means defined in claim 12 further comprising pivotal variation means to provide for a selective alteration of an angle of attack of the wing member to aid in conditioning of the air flow.

14. The cross wind conditioning means defined in claim 11 further comprising:
   a) a left segmented upper side pivotal panel pivotally mounted on the left rear vertically oriented trailing edge of the segmented air deflector, the left segmented upper side pivotal panel having a substantially vertical orientation extending rearward from the segmented air deflector, the left segmented upper side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the left segmented upper side pivotal panel away from the imaginary center line of the tractor, the extended position providing characteristics to stream line air flow around the trailer during motion of the tractor trailer combination to reduce drag, the retracted position placing the rearward trailing edge near the imaginary center line of the tractor, the retracted position causing redirection of the air flow during motion of the tractor trailer combination to cause the air flow to pass between the tractor and the trailer;
   b) a right segmented upper side pivotal panel pivotally mounted on the right rear vertically oriented trailing edge of the segmented air deflector, the right segmented upper side pivotal panel having a substantially vertical orientation and extending rearward from the segmented air deflector, the right segmented upper side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the right segmented pivotal panel away from the imaginary center line of the tractor, the extended position providing characteristics to stream line air flow around the trailer during motion of the tractor trailer combination to reduce drag, the retracted position placing the rearward trailing edge of the right segmented upper side pivotal panel near the imaginary center line of the tractor, the retracted position causing redirection of the air flow during motion of the tractor trailer combination to cause the air flow to pass between the tractor and the trailer;
   c) a second left drive means to provide for a selective transfer of the left segmented upper side pivotal panel between the alternating positions;
   d) a second right drive means to provide for a selective transfer of the right segmented upper side pivotal panel between the alternating positions;
   e) and wherein the left control means further provides for activation of the second left drive means to transfer the left segmented upper side pivotal panel between the alternating positions;
   f) and wherein the right control means further provides for activation of the second right drive means to transfer the right segmented upper side pivotal panel between the alternating positions;

whereby the respective control means would cause the respective second drive means to cause the respective segmented upper side extending panels to be placed in one of the alternating positions.

15. The cross wind conditioning means defined in claim 14 further comprising:
   a) a wing member having:
      1) a leading edge;
      2) a trailing edge;
      3) a first surface convex shaped and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface, the attachment surface an exposed surface of the segmented air deflector;

whereby the wing member provides additional conditioning of the air flow.

16. The cross wind conditioning means defined in claim 15 further comprising pivotal variation means to provide for a selective alteration of an angle of attack of the wing member to aid in conditioning of the air flow.

17. The cross wind conditioning means defined in claim 14 further comprising:
   a) a left segmented lower side pivotal panel pivotally mounted on the left rear vertically oriented trailing edge of the tractor housing, the left segmented lower side pivotal panel having a substantially vertical orientation and extending rearward from the tractor housing, the left segmented lower side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the left segmented lower side pivotal panel away from the imaginary center line of the tractor, the extended position providing characteristics to stream line air flow around the trailer during motion of the tractor trailer combination to reduce drag, the retracted position placing the rearward trailing edge of the left segmented lower side pivotal panel near the imaginary center line of the tractor, the retracted position causing redirection of the air flow during motion of the tractor trailer combination to cause the air flow to pass between the tractor and the trailer;
   b) a right segmented lower side pivotal panel pivotally mounted on the right rear vertically oriented trailing edge of the tractor housing, the right segmented lower side pivotal panel having a substantially vertical orientation and extending rearward from the tractor housing, the right segmented lower side pivotal panel having a rearward trailing edge, a pivotal range of motion and alternating positions, the alternating positions being the extremes of the pivotal range of motion, the alternating positions being an extended position and a retracted position, the extended position placing the rearward trailing edge of the right segmented lower side pivotal panel away from the imaginary center line of the tractor, the extended position providing characteristics to stream line air flow around the trailer during motion of the tractor trailer combination to reduce drag, the retracted position placing the rearward trailing edge of the right segmented lower side pivotal panel near the imaginary center line of the tractor, the retracted position causing redirection of the air flow during motion of the tractor trailer combination to cause the air flow to pass between the tractor and the trailer;
   c) a third left drive means to provide for a selective transfer of the left segmented lower side pivotal panel between the alternating positions;
   d) a third right drive means to provide for a selective transfer of the right segmented lower side pivotal panel between the alternating positions;
   e) and wherein the left control means further provides for activation of the third left drive means to transfer the left segmented lower side pivotal panel between the alternating positions;
   f) and wherein the right control means further provides for activation of the third right drive means to transfer the right segmented lower side pivotal panel between the alternating positions;
whereby the respective control means would cause the respective third drive means to cause the respective segmented lower side extending panels to be placed in one of the alternating positions.

18. The cross wind conditioning means defined in claim 17 further comprising:
   a) a wing member having:
      1) a leading edge;
      2) a trailing edge;
      3) a first surface convex shaped and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface;
whereby the wing member provides additional conditioning of the air flow.

19. The cross wind conditioning means defined in claim 18 further comprising pivotal variation means to provide for a selective alteration of an angle of attack of the wing member to aid in conditioning of the air flow.

* * * * *